US010708847B2

(12) United States Patent
Pison

(10) Patent No.: US 10,708,847 B2
(45) Date of Patent: Jul. 7, 2020

(54) METHOD OF ATTACHMENT BETWEEN AT LEAST ONE MOBILE NETWORK AND ONE REMOTE NETWORK

(71) Applicant: Laurent Pison, Jouars Ponchartrain (FR)

(72) Inventor: Laurent Pison, Jouars Ponchartrain (FR)

(73) Assignee: Cassidian SAS, Elancourt (FR)

( * ) Notice: Subject to any disclaimer, the term of this patent is extended or adjusted under 35 U.S.C. 154(b) by 493 days.

(21) Appl. No.: 14/349,994

(22) PCT Filed: Oct. 9, 2012

(86) PCT No.: PCT/EP2012/004227
§ 371 (c)(1),
(2) Date: Apr. 4, 2014

(87) PCT Pub. No.: WO2013/053462
PCT Pub. Date: Apr. 18, 2013

(65) Prior Publication Data
US 2014/0254430 A1  Sep. 11, 2014

(30) Foreign Application Priority Data

Oct. 10, 2011 (FR) ..................................... 11 03082

(51) Int. Cl.
*H04W 40/24* (2009.01)
*H04W 8/02* (2009.01)
*H04W 92/02* (2009.01)

(52) U.S. Cl.
CPC ........... *H04W 40/248* (2013.01); *H04W 8/02* (2013.01); *H04W 92/02* (2013.01)

(58) Field of Classification Search
None
See application file for complete search history.

(56) References Cited

U.S. PATENT DOCUMENTS

2002/0062379 A1* 5/2002 Widegren ............... H04L 29/06
  709/227
2003/0154306 A1* 8/2003 Perry ................. H04L 29/12009
  709/245

(Continued)

FOREIGN PATENT DOCUMENTS

EP  1 578 067 A1  9/2005

OTHER PUBLICATIONS

International Search Report for related International Application No. PCT/EP2012/004227; report dated Jan. 7, 2013.

*Primary Examiner* — Ayaz R Sheikh
*Assistant Examiner* — Mariela Vidal Carpio
(74) *Attorney, Agent, or Firm* — Miller, Matthias & Hull LLP

(57) ABSTRACT

A radiocommunications system (E) that implements a method for attachment between a mobile radiocommunications network (RM) and a remote radiocommunications network (RD). The infrastructure of each of the mobile radiocommunications network and remote radiocommunications network includes a network supervision (SUPM, SUPD), an application level (NAPM, NAPD) having at least one application (APM, APD), an authentication and mobility management level (NAMM, NAMD) and user terminals (TUM, TUD). A radio management level (NCRM, NCRD) is also included having at least one base station (BSM, BSD).

11 Claims, 5 Drawing Sheets

(56) References Cited

U.S. PATENT DOCUMENTS

| | | | | |
|---|---|---|---|---|
| 2003/0156541 A1* | 8/2003 | Haihong | ............... | H04L 45/50 |
| | | | | 370/235 |
| 2004/0081152 A1* | 4/2004 | Thubert | ............... | H04L 45/04 |
| | | | | 370/392 |
| 2009/0257346 A1* | 10/2009 | Ng | ............ | H04W 24/00 |
| | | | | 370/217 |
| 2009/0310535 A1* | 12/2009 | Anumala | ............. | H04W 8/26 |
| | | | | 370/328 |
| 2010/0054257 A1* | 3/2010 | Dolganow | ......... | H04L 65/1016 |
| | | | | 370/395.21 |
| 2010/0166003 A1* | 7/2010 | Eriksson | ............. | H04L 12/66 |
| | | | | 370/401 |
| 2011/0090842 A1* | 4/2011 | Hirano | ................ | H04L 63/12 |
| | | | | 370/328 |
| 2011/0228750 A1* | 9/2011 | Tomici | .............. | H04W 8/082 |
| | | | | 370/338 |
| 2012/0084368 A1* | 4/2012 | Go | ............ | H04L 9/0822 |
| | | | | 709/206 |

\* cited by examiner

METHOD OF ATTACHMENT BETWEEN AT LEAST ONE MOBILE NETWORK AND ONE REMOTE NETWORK

CROSS-REFERENCE TO RELATED APPLICATION

This application is a 35 USC § 371 U.S. national stage filing of International Patent Application No. PCT/EP2012/004227 filed on Oct. 9, 2012, and claims priority to French Patent Application No. FR 11 03082 filed on Oct. 10, 2011.

FIELD OF THE INVENTION

This invention relates to a method of attachment between at least one mobile network and another network, called the remote network. More particularly, the mobile network and the remote network are cellular radiocommunications networks. Such a method applies to the area of professional radiocommunications networks of the tactical type (called 'Projectable and Tactical Networks'), also designated by the abbreviation PTN.

BACKGROUND OF THE INVENTION

Such tactical radiocommunications networks are usually PMR (Professional Mobile Radiocommunications) networks of the TETRA (Trans European Trunked Radio) type or TETRAPOL type defined by the TETROPOL manufacturers' forum (http:/www.tetrapol.com) or of the P25 type defined by the Telecommunications Industry Association (TIA) for the Association of Public Safety Communications Officers (APCO). PMR networks are private networks with a high level of security. As a result, they are widely used by public safety services, such as law enforcement agencies. These PMR networks follow the technological development of civilian telecommunications, and sometimes use the same resources as those used by operators' networks (wireless and satellite links, fibre optic transmission, voice and data switching).

When a crisis situation (such as an earthquake or a flood or other) occurs in a particular geographic area, professional or public fixed networks in the area can become totally or partly inoperable. In order to supply public safety departments with resources capable of controlling the crisis situation, professional tactical radiocommunications networks are deployed in the field. Currently, radio access points are deployed by tactical vehicles that support radio base stations, which use the technology of the terminals located in the area of intervention.

However, it may happen that the users of a tactical radiocommunications network wish to access the services offered by another fixed or mobile remote radiocommunications network. In such as case, interoperability is very difficult and a particular protocol must be put in place by an operator between the tactical network and the remote network offering additional services.

SUMMARY OF THE INVENTION

In that context, the invention aims to propose a method of attachment between at least one mobile network and one remote network so as to achieve a single network encompassing both the mobile network and the remote network. To that end, the invention relates to a method of attachment between at least one mobile network and one remote network, where the infrastructure of each of the said mobile radiocommunications network and remote radiocommunications network comprises:

a network supervision means,
an application level comprising at least one application,
an authentication and mobility management level,
a radio management level with at least one base station, and
user terminals,
the method comprises the following steps:
saving in the mobile network supervision means of at least one first inter-network operating model per level to attach to the remote network,
saving in the remote network supervision means of at least one second inter-network operating model per level to attach to the mobile network,
upon the detection of one of the two networks by the other network:
configuration of each level of the mobile network in accordance with the at least one first inter-network operating model for the said level,
configuration of each level of the remote network in accordance with the at least one second inter-network operating model for the said level, and
establishment of at least one inter-network control channel between one element of the mobile network and one element of the remote network and at least one inter-network data channel between one element of the mobile network and one element of the remote network in accordance with the first and second operating models configured per level.

Thanks to the method in the invention, when a mobile network is close to the remote network, the two networks, mobile and remote, are capable of attaching to each other so that the user terminals of the two networks can benefit from the services offered by the mobile network and the remote network. Such attachment is achieved by establishing the transport link that thus makes it possible to obtain a single network, called overall network, encompassing the mobile network and the remote network.

The attachment method between at least one mobile network and a first network according to the invention may also have one or more of the characteristics below, considered individually or in all the combinations that are technically possible.

In a non-limitative embodiment, the method comprises, before the configuration steps, a synchronisation step per level of the first inter-network operating model with the second inter-network operating model.

In a non-limitative embodiment, the method comprises, before the synchronisation step, a step for the establishment of an inter-network supervision channel between the supervision means of the mobile network and the supervision means of the remote network.

In a non-limitative embodiment, an inter-network operating model per level comprises parameters for configuring the said level.

In a non-limitative embodiment, the configuration parameters of the application level configure each at least one application of the application level according to one of the following inter-network configurations: a master-slave configuration, a distributed configuration or an independent configuration.

In a non-limitative embodiment, the method comprises the parameters for the configuration of the authentication and mobility management level that configure an authentication database for the said level in accordance with one of the following inter-network configurations: a master-slave configuration or a distributed configuration.

In a non-limitative embodiment, the parameters for the configuration of the authentication and mobility management level configure an authentication and mobility management means for the said level in accordance with one of the following inter-network configurations: a master-slave configuration, a static distributed configuration or a dynamic distributed configuration.

In a non-limitative embodiment, the parameters for the configuration of the authentication and mobility management level configure a distribution gateway for the said level in accordance with one of the following inter-network configurations: a master-slave configuration, a static distributed configuration or a dynamic distributed configuration.

In a non-limitative embodiment, the parameters for the configuration of the authentication and mobility management level configure means for attachment to a packet network of the said level in accordance with one of the following inter-network configurations: a master-slave configuration, a distributed configuration or an independent configuration.

In a non-limitative embodiment, the configuration parameters of the radio management level configure the database according to one of the following inter-network configurations: a distributed configuration or an independent configuration.

The invention also relates to a communication system comprising at least one mobile radiocommunications network and at least one remote radiocommunications network, the infrastructure of each of the said mobile radiocommunications network and the remote radiocommunications network comprising:
  a network supervision means,
  an application level comprising at least one application;
  an authentication and mobility management level;
  a radio management level with at least one base station; and
  user terminals;
  the system implementing the attachment method.

Other characteristics and advantages of the method of attachment between at least one mobile network and one remote network will become clearer in the description given below, for information and not limitative in any way, by reference to the figures enclosed, where:

For clarity, only the elements essential for understanding the invention have been represented, with no regard for scale, in a schematic fashion. In the description below, the elements with identical and/or similar functions in different drawings bear the same reference in those drawings.

DETAILED DESCRIPTION

Figure 1:
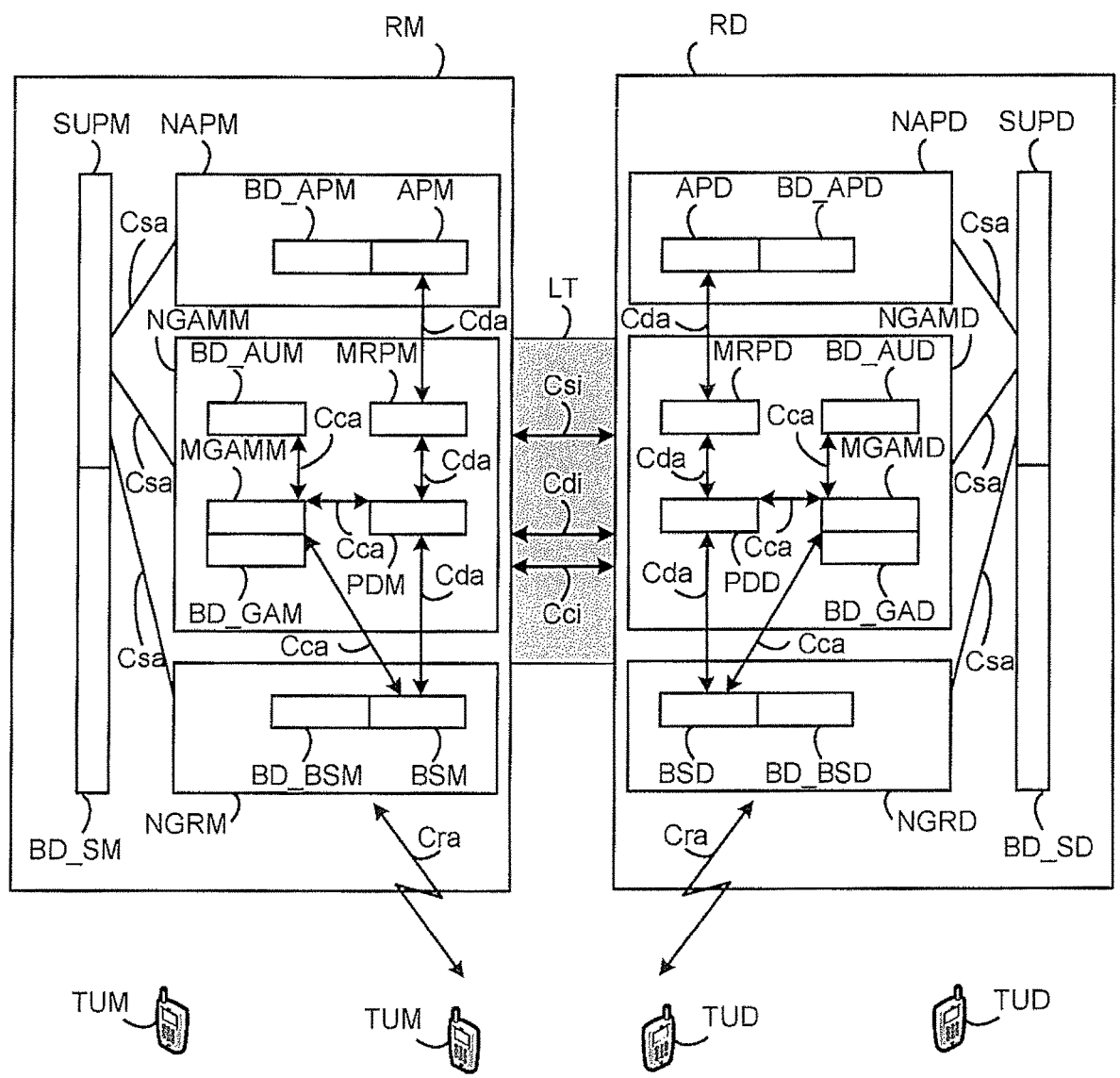
FIG. 1 represents a radiocommunications system comprising at least one mobile radiocommunications network attached to a remote radiocommunications network in accordance with an attachment method according to the invention.

The radiocommunications system illustrated in FIG. 1 comprises a mobile radiocommunications network, RM, and another radiocommunications network called the remote network, RD. Remote network, RD, means a network that is close to or far from the mobile network detectable by the mobile network and/or capable of detecting the mobile network. The mobile network RM and the remote network RD are broadband cellular radiocommunications network. For example, the mobile network and the remote network may be broadband radiocommunications networks based on LTE (Long Term Evolution) technology or mobile WiMAX (Worldwide interoperability for Microwave Access) technology or 3G third-generation technology. The mobile network and the remote network may use technologies that are different but at least compatible for data exchange at the IP (Internet Protocol) level. According to the invention, the two networks RM and RD must be capable of attaching to each other so that the user terminals of the mobile network can benefit from the services offered by the remote network and vice versa. Attachment between the mobile network and the remote network is achieved by establishing a transport link LT between the mobile network and the remote network. Such attachment thus makes it possible to obtain a single network encompassing the user terminals TUM of the mobile network and the user terminals TUD of the remote network. A user terminal of a network means a terminal that can be authenticated by the network away from attachment with another network.

The mobile radiocommunications network RM is a PTN (Projectable and Tactical Network) type radiocommunications network. Such a mobile network may be deployed on the ground by a tactical vehicle supporting at least one radio base station, which uses the technology of the user terminals located in the area of intervention. The remote network may be a tactical mobile network, such as another intervention vehicle, or a fixed network. The remote network RD may also be a network using access links that may use geostationary means such as a satellite or a drone.

The mobile network RM can attach to several remote radiocommunications networks in accordance with the attachment method in the invention. However, to simplify the description of the invention, only one attachment between the mobile network and the remote network has been described.

The mobile network RM and the remote network RD support two main operating modes: a nominal operating mode when the networks are not attached to each other and an inter-network operating mode when the two networks are attached to each other.

The infrastructure of the mobile network RM and the infrastructure of the remote network RD each respectively comprise the following elements, in a non-comprehensive manner:
  a supervision means, SUPM, SUPD,
  an application level NAPM, NAPD,
  an authentication and mobility management level NGAMM, NGAMD,
  a radio management level NGRM, NGRD, and
  user terminals TUM, TUD.

Figure 2:
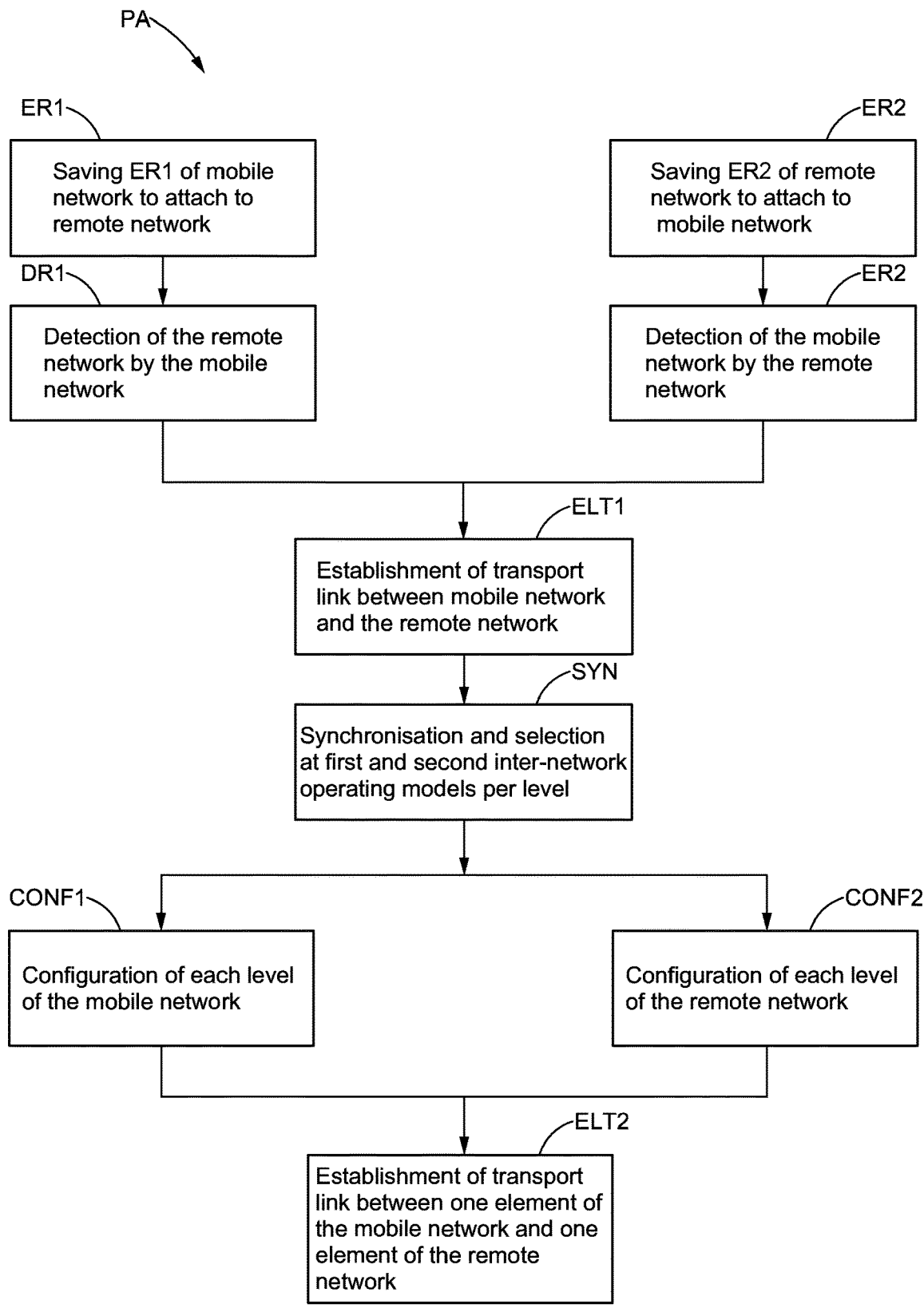
FIG. 2 represents a non-limitative synoptic chart of the steps in the method for attachment between at least one mobile network and a remote network according to the invention.

The elements of the infrastructure of each network according to the invention illustrated in FIG. 2 only include schematic representations of functions in relation with the invention that correspond with the software modules implemented in one or more processors and/or programmable or dedicated hardware modules.

The supervision means SUPM, SUPD manages network supervision in nominal mode, called nominal supervision, and network supervision in inter-network mode, called inter-network supervision.

Nominal supervision makes it possible to implement the successive starting up of the elements of the different levels of the network infrastructure RM, RD. Nominal supervision is carried out by exchange between the supervision means SUPM, SUPD of the network and the network elements via intra-network supervision channels Csa. During nominal operation of the network, intra-network control channels Cca and intra-network data channels Cda are established between elements of the same network. Intra-network control channels Cca transmit signalling data between elements of the same network. Intra-network data channels Cda transmit traffic data between elements of the same network.

Inter-network supervision makes it possible to implement the attachment of the network RM, RD with a remote network RD, RM:
  by detecting and authenticating the remote network,
  by establishing the transport link LT between the network and the remote network detected and authenticated. The transport link comprises an inter-network supervision channel Csi established between the supervision means of the network RM, RD and the supervision means of the remote network RD, RM,
  by synchronising a first inter-network operating model per level for configuring each level of the network RM, RD with a second inter-network operating model by equivalent level for configuring each level of the remote network RD, RM, and
  by configuring each level of the network RM, RD in accordance with the network configuration parameters established according to the first inter-network operating model of the level, the network configuration parameters of one level being compatible with the configuration parameters of the equivalent level of the second inter-network operating model configuring the remote network RD, RM.

After the network is configured, at least one inter-network control channel Cci for transporting signalling data is established between one element of the mobile network and one element of the remote network. Also, at least one inter-network data channel Cdi for transporting traffic data is established between one element of the mobile network and one element of the remote network. The control channel Cci and the data channel Cdi go through the transport link and are established in accordance with the first and second inter-network operating models.

The supervision means SUPM, SUPD is connected to a supervision database BD_SM, BD_SD. The supervision database BD_SM, BD_SD comprises, for each level of the network infrastructure, at least one inter-network operating model to be applied to the corresponding level when the network RM, RD attaches to the remote network RD, RM. Thus, at least three inter-network operating models are saved in the supervision database: an inter-network operating model for the application level, an inter-network operating model MFIM-AM, MFID-AM for the authentication and mobility management level and an inter-network operating model MFIM-R, MFID-R for the radio management level. In what follows of the description of the invention, at least three first inter-network operating models MFIM-AP, MFIM-AM, MFIM-R for the three levels of the infrastructure of the mobile network respectively are saved in the database BD_SM of the supervision means SUPM of the mobile network RM. Also, at least three second inter-network operating models MFID-AP, MFID-AM, MFID-R for the three levels of the infrastructure of the remote network respectively are saved in the database BD_SD of the supervision means SUPD of the remote network RD. In that case, each of the at least first inter-network operating models of a level is compatible with the at least second inter-network operating model of the equivalent level. The database BD_SM, BD_SD may comprise several different inter-network operating models per level. Different inter-network operating models per level are described in what follows of the description. One inter-network operating model per level can be saved in the database BD_SM, BD_SD in association with a remote network identifier RD, RM comprising an inter-network operating model per equivalent compatible level.

The application level NAPM, NAPD of the network infrastructure RM, RD comprises at least one application APM, APD. For example, the application level NAPM, NAPD may comprise one group communication application and/or one video application and/or other application. The application is accessible in nominal mode by the terminals TUM, TUD of the network RM, RD with the right to access the said application. Similarly, the application may also be accessible in inter-network mode by the terminals TUM, TUD of the remote network RD, RM with the right to access the said application. The application level also comprises an application database BD_APM, BD_APD, comprising user data useful to the at least one application APM, APD. For example, for a group communication application, the database comprises one or more lists of users and data relating to the said users to apply to the said application. The at least one application APM of the mobile network RM and the at least one application APD of the remote network RD can be saved in one or more application servers accessible by the authentication and mobility management level NGAMM of the mobile network and by the authentication and mobility management level NGAMD of the remote network via an IP (Internet Protocol) type packet network.

The level of authentication and mobility management NGAMM, NGAMD, comprises an authentication database BD_AUM, BD_AUD, authentication and mobility management means MGAMM, MGAMD, at least one distribution gateway PDM, PDD, at least one means for attachment MRPM, MRPD to the packet network and a mobility management database BD_AMM, BD_AMD. With LTE technology, the authentication and mobility management level NGAMM, NGAMD is the EPC (Evolved Packet Core) and the HSS (Home Subscriber Server) entity. With 3G technology, the authentication and mobility management level is the GGSN (Gateway GPRS Support Node), SGSN (Serving GPRS Support Node) and HLR (Home Location Register) entities. With Wimax technology for authentication and mobility management, the level is the CSN-GW (Connectivity Service Network Gateway), ASN-GW (Access Service Network Gateway) and AAA (Key Authentication Authorisation Accounting) entities.

In nominal mode, the authentication database BD_AUM, BD_AUD comprises authentication data of the user terminals of the network RM, RD wishing to attach to the network RM, RD. These authentication data are required for authenticating the user terminals. For example, IMSI (International Mobile Subscriber Identity) identities of the user terminals TUM, TUD registered in the network RM, RD are saved in the database BD_AUM, BD_AUD. Also, the rights to access the applications of each user terminal are saved in the database BD_AUM, BD-AUD. In inter-network mode, the authentication database BD_AUM, BD_AUD may also comprise authentication data of the user terminals of the remote network RD, RM wishing to attach to the network RM, RD. With LTE technology, the authentication database is the HSS (Home Subscriber Server) server. With 3G technology, the authentication database is the HLR (Home Location Register) server. With Wimax technology, the authentication database is the AAA (Key Authentication Authorisation Accounting) server.

In nominal mode, the authentication and mobility management means MGAMM, MGAMD manages the authentication of terminals TUM, TUD that want to attach to the network RM, RD. Authentication is carried out on the basis of the authentication data of the user terminals saved in the authentication database BD_AUM, BD_AUD. The management means MGAMM, MGAMD is then connected to the authentication database via an intra-network control channel Cca, for example of the S6a type with LTE technology. In inter-network mode, the authentication and mobility means MGAMM, MGAMD may also manage the authentication of terminals TUD, TUM of the remote network RD, RM. The management means MGAMM, MGAMD can then also be connected to the remote network authentication database via an inter-network control channel Cci, for example of the S6a type with LTE technology.

The management means MGAMM, MGAMD, can control at least:
- in nominal mode, a base station BSM, BSD of the network RM, RD, via an intra-network control channel Cca or/and in inter-network mode, a base station of the remote network RD, RM via an inter-network control channel Cci, where the channels Cca and Cci may for example be of the S1-MME type with LTE technology,
- in nominal mode, a distribution gateway PDM, PDD of the network RM, RD, via an intra-network control channel Cca or/and in inter-network mode, a distribution gateway PDD, PDM of the remote network RD, RM via an inter-network control channel Cci, where the control channels Cca and Cci may for example be of the S11 type with LTE technology, The management means MGAMM, MGAMD, may select a distribution gateway and means for attachment of one of the two networks according to the network operating mode (nominal mode or inter-network mode) and/or in accordance with the first or second inter-network operating models configured for that level. After selection, the management means orders the selected distribution gateway to establish an intra-network or inter-network access channel between the said gateway and the selected attachment means. An access channel is established for each user terminal attaching to the network and/or the remote network. When the terminal asks for access to an application, an intra-network data channel Cda or an inter-network data channel Cdi is established and passes in the intra-network or inter-network access channel. With LTE technology, the intra-network access channel comprising an intra-network data channel Cda, and the inter-network access channel comprising an inter-network data channel Cdi is of the S5 or S8 type.

The management means MGAMM, MGAMMD also manages the mobility of the user terminals TUM, TUD attached to the network RM, RD and/or the remote network RD, RM moving from one base station to another in the said network RM, RD and in the remote network RD, RM.

The management means MGAMM, MGAMD may also manage the registration of the user terminals of the network or of another network without authentication during emergency calls of the type calls to the central operator in PMR type networks.

With LTE technology, the management means MGAMM, MGAMD is the MME (Mobility Management Entity) control node. With 3G technology, the management means MGAMM, MGAMD is the SGSN (Serving GPRS Support Node). With Wimax technology, the management means MGAMM, MGAMD is the CSN (Connectivity Service Network) and ASN (Access Service Network) entities.

The authentication and mobility management means MGAMM, MGAMD is also connected to a mobility management database BD_GAM, BD_GAD comprising radio access configuration data. The radio access configuration data may for example be the maximum number of control channels that may be established by the management means towards base stations or distribution gateways. The radio access configuration data may also be one or more identifiers of distribution gateways and base stations with which the authentication and mobility management means can establish control channels.

In nominal mode, the distribution gateway PDM, PDD carries out radio reception and transmission with at least one base station BSM, BSD, of the network RM, RD via an intra-network data channel Cda. The distribution gateway PDM, PDD routes and retransmits data packets to the attachment means MRPM, MRPD of the network RM, RD by means of an intra-network access channel comprising an intra-network data channel Cda. In inter-network mode, the distribution gateway PDM, PDD can carry out radio reception and transmission with one base station BSM, BSD, of the remote network RD, RM via an inter-network data channel Cdi. The distribution gateway PDM, PDD can also route and retransmit data packets from a terminal in one of the two networks to the attachment means MRPD, MRPM of the remote network by means of an inter-network access channel comprising an inter-network data channel Cdi. With LTE technology, the distribution gateway is the SGW (Serving Gateway). With LTE technology, the intra-network data channel Cda between a distribution gateway of a network and the base station of the same network and the inter-network data channel between a distribution gateway of one network and the base station of the other network are channels of the S1-U type. With LTE technology, the intra-network access channel and the inter-network access channel are of the S5 or S8 type.

In nominal mode, the means for attachment to a packet network MRPM, MRPD, acts as the IP (Internet Protocol) interface to the applications of the application level. The attachment means forms an anchoring point to the IP network. With LTE technology, the attachment means is the PGW (Package data network Gateway). With LTE technology, an intra-network data channel Cda or inter-network data channel Cdi is a channel of the SGi type.

The radio management level NGRM, NGRD comprises at least one base station BSM, BSD. In nominal mode, the base station BSM, BSD carries out radio transmission and reception between the network infrastructure RM, RD and the user terminals TUM, TUD of the said network RM, RD. In inter-network mode, the base station BSM, BSD can also carry out radio transmission and reception between the user terminals TUD, TUM of the remote network RD, RM and the infrastructure of the network RM, RD or the infrastructure of the remote network RD, RM.

The radio management level NGRM, NGRD, can also comprise a radio database BD_GRM, BD_GRD comprising radio configuration data. Radio configuration data may for example be the number of radio channels that can be established between a base station and user terminals. Similarly, radio configuration data may also be the maximum number of intra-network and inter-network control channels that can be established between the base station and the authentication and mobility management means.

With LTE technology, the radio management level NGRM, NGRD, is an eNodeB (evolved Node B) node. With 3G technology, the radio management level is an RAN (Radio Access Network) entity. With Wimax technology, the radio management level is a BS (Base Station).

In nominal mode, user terminals TUM, TUD, referenced in the authentication database BD_AUM, BD_AUD, and present under the network coverage of the network RM, RD may attach to a base station BSM, BSD of the network in order to access the at least one application APM depending on their access right. In inter-network mode, user terminals of one of the two networks that could be referenced in one of the two authentication databases BD_AUM, BD_AUD may attach to one base station of one of the two networks in order to access, depending on their access right, one of the applications APM, APD of the two networks RM, RD. A data channel, called the overall data channel, established between a user terminal of one of the two networks and an application of one of the two networks may comprise a succession of intra-network data channels Cda and inter-network channels Cdi connecting the different following successive elements of one of the two networks: the user terminal, a base station, a distribution gateway, attachment means and an application.

The method for attachment PA between the mobile network RM and the remote network RD is illustrated in FIG. 2 and is implemented by means for supervision of the two networks. The method comprises the following main steps:
  saving ER1 in the supervision database BD_SM of the mobile network RM of at least one first inter-network operating model per level to attach to the remote network RD,
  saving ER2 in the supervision database BD_SD of the remote network RD of at least one second inter-network operating model per level to attach to the mobile network RM,
  detection DR1 of the remote network by the mobile network, and/or
  detection DR2 of the mobile network by the remote network,
  establishment ELT1 of the transport link LT between the mobile network and the remote network,
  synchronisation and selection SYN of the first and second inter-network operating models per level, between the two means of supervision of the two networks,
  configuration CONF1 of each level of the mobile network RM in accordance with the first inter-network operating model selected and corresponding with the said level,
  configuration CONF2 of each level of the remote network RD in accordance with the second inter-network operating model selected and corresponding with the said level, and
  establishment ELT2 in the transport link LT of at least one inter-network control channel Cci between one element of the mobile network and one element of the remote network and at least one inter-network data channel Cdi between one element of the mobile network and one element of the remote network in accordance with the first and second operating models configured per level.

It is understood that:
  the saving steps ER1 and ER2 can be carried out simultaneously or successively,
  the detection steps DR1 and DR2 can be carried out simultaneously or successively, and
  the configuration steps CONFR1 and CONFR2 can be carried out simultaneously or successively.

In each network, the steps of saving, detection, establishment of the transport link, configuration and synchronisation are carried out successively.

The saving steps ER1 and ER2 are carried out before on-site intervention during which attachment between the mobile network RM and the remote network RD can be established. The step ER1 is a record of at least one first inter-network operating model per level in the supervision database BD-SM of the mobile network. The at least one first inter-network operating model per level may be saved in association with an identifier of the remote network in the supervision database BD-SM of the mobile network. The supervision database BD-SM can include several first inter-network operating models for each level of infrastructure of the mobile network RM. These different operating models per level are described in what follows of the description.

The step ER2 comprise a record of at least one second inter-network operating model per level in the supervision database BD-SM of the remote network. The at least one second operating model per level may be saved in association with an identifier of the mobile network RM in the supervision database BD-SD of the remote network. The supervision database BD-SM can include several second inter-network operating models for each level of infrastructure of the remote network RD. These different operating models per level are described in what follows of the description.

The first and second inter-network operating models per level comprise parameters for configuration of the corresponding levels in order to implement the inter-network operating mode of the two attached networks.

The detection step DECTR1, DECTR2 of the remote network RD, RM in each network RM, RD must comprise:
  wired detection of an Ethernet or other cable connected between the two networks, or
  radio detection of radio devices foreign to the said network. Foreign radio devices means other devices such as satellites or drones or others, which do not interfere with the radio characteristics of the networks RM and RD.

The step of establishing ELT1 the transport link LT between the two networks comprises mutual authentication between the two remote networks detected to establish attachment between the said two remote networks. Mutual authentication may comprise:
  synchronisation (generally electrically or by radio) of the physical and data linking layers of the mobile network RM with those of the remote network RD, then
  synchronisation of the network and transport layers of the mobile network RM with those of the remote network RD. In a non-limitative example, the layers are synchronised by exchanging and verifying the MAC (Medium Access Control) addresses of the two networks.

The establishment of the LT transport link comprises the establishment of an inter-network supervision channel Csi between the means for supervising the mobile network and the means for supervising the remote network. The inter-network supervision channel Csi is a transport level channel according to the OSI standard.

The synchronisation step SYN is carried out by exchanges between the supervision means of the two networks via an inter-network supervision channel Csi. During the synchronisation step, each supervision means analyses the inter-network operating models in the associated supervision database. Each supervision means checks if at least one inter-network operating model per level is compatible with an inter-network operating model of an equivalent level in the other network. For a level, if no operating model is compatible with another operating model of the other network, attachment is not possible. If, per level, one or more operating models are compatible with one or more operating models of the other network, each supervision means of the network selects the most optimal inter-network operating model per level. The most optimal inter-network operating model is the operating model that is most suitable for application to the network for the intervention under way. The selection between several possible models per level may be made on the basis of priority. The selection of an operating model for each level activates the network configuration step CONFR1, CONFR2. As a variant, each supervision means displays for one operator the inter-network operating model or models per level that could be applied to the network. The supervision means displays the said models on a display means of a network control platform that can be seen by the operator. The selection of the operator of an inter-network operating model per level displayed activates the network configuration step CONFR1, CONFR2.

An inter-network operating model can also be selected and validated depending on the physical capacity of the physical link (radio or wired) established between the two networks.

The synchronisation step can also make it possible to manage potential incompatibility errors between the two networks, for example due to a problem relating to the configuration of inter-network operating models.

During the configuration step CONFR1, CONFR2, each supervision means SUPM, SUPD, of each network RM, RD recovers from the associated supervision database BD_SM, BD_SD the inter-network operating model selected per level. The supervision means applies the parameters of configuration of the inter-network operating model to each element of the network for each level. The parameters are transmitted by means of intra-network supervision channels Csa.

In the step ELT2, one or more inter-network control channels Cci are established between the elements of the two networks depending on the configuration of the networks. One or more inter-network data channels Cdi are also established between the elements of the two networks depending on the configuration of the networks and when one or more user terminals wishes to access at least one application of one of the two networks.

In the description below, different inter-network operating models are presented per level of network infrastructure. For each level of network infrastructure an inter-network operating model comprises the configuration parameters of the said level. Thus, the supervision means applies configuration parameters of the application level NAPM, NAPD, configuration parameters of the authentication and mobility management level NGAMM, NGAMD, and configuration parameters of the radio management level NGRM, NGRD.

On the application level NAPM, NAPD, the configuration parameters configure each at least one application APM, APD, according to one of the following inter-network configurations: a master-slave configuration, a distributed configuration or an independent configuration.

In the master-slave configuration of the application level, an application of one of the two networks manages all the users of the two networks with its database. If the other network comprises a similar application, the said similar application will be inactive in inter-network operating mode. The similar application will only be active in the nominal operating mode.

In a distributed configuration of the application level, two similar applications, in each of the application levels of the two networks respectively, manage their database and can exchange application data to manage all the users. Thus, a user terminal of the remote network can access a distributed application of the mobile network, the said application will call an application of the remote network or the database of the remote network to make the request. For example, each network RM and RD comprises an application APM, APD, refereeing specific group communication for the user terminals TUM, TUD of the same network. In distributed mode, the applications APM and APD can together manage group communications of all the user terminals TUM, TUD.

In the independent configuration of the application level, all the applications of the application levels of the two networks are accessible by all the user terminals of the two networks. This may be called a union of applications. For example, a mobile network comprises a group communication application accessible by all the user terminals of the two networks and the remote network comprises a video application also accessible by all the user terminals of the two networks.

With the exception of master-slave configurations of applications, the exchange of user data between an application APM of the mobile network and an application APD of the remote network is carried out via an inter-network control channel Cci and an inter-network data channel Cdi of the IP channels type.

On authentication and mobility management level NGAMM, NGAMD, the configuration parameters configure the authentication database BD_AUM, BD_AUD, according to one of the following inter-network configurations: a master-slave configuration or a distributed configuration.

In the master-slave configuration of the authentication databases, one of the authentication databases of one of the two networks, called the master authentication database, manages the authentication data of the user terminals of the two networks. The master authentication database comprises all the authentication data of the user terminals of the two attached networks. The other authentication database, called the slave authentication database, only includes the data of the user terminals of the associated network and only manages those authentication data in the nominal operating mode of the associated network. In the master-slave configuration, the authentication and mobility management means MGAMM and MGAMD of the two networks only call the master authentication database for authenticating the user terminals. In the master-slave configuration of the authentication databases and depending on one of the inter-network configurations applied to the authentication and mobility management means (described below), at least one intra-network control channel Cca and/or inter-network control channel Cci may be established between the master authentication database and at least one authentication and mobility management means of one of the two networks.

In the distributed configuration of the authentication database, each authentication database BD_AUM, BD_AUD manages all the authentication data of the user terminals TUM, TUD of the associated network RM, RD. Thus, the authentication database BD-AUM of the mobile network RM manages the authentication data of the user terminals TUM of the mobile network RM. Similarly, the authentication database BD-AUD of the remote network RD manages the authentication data of the user terminals TUD of the mobile network RD. Thus, the authentication and mobility management means of each of the two networks call one or the other of the authentication databases comprising authentication data of the user terminal that it must authenticate. In the distributed configuration of the authentication databases and depending on one of the inter-network configurations applied to the authentication and mobility management means, one intra-network control channel Cca and/or inter-network control channel Cci can be established between each authentication database of the two networks and at least one of the two authentication and mobility management means of one of the two networks.

On authentication and mobility management level NGAMM, NGAMD, the configuration parameters also configure the authentication and mobility means MGAMM, MGAMD, according to one of the following inter-network configurations: a master-slave configuration, a static distributed configuration or a dynamic distributed configuration.

In the master-slave configuration of the authentication and mobility management means MGAMM and MGAMD, only one authentication and mobility management means of the one of the two networks, called the master authentication and mobility management means, is active. The other means of authentication and mobility management of the other network, the so-called slave authentication and mobility management means, is inactive in the inter-network operating mode.

In the static distributed configuration of the authentication and mobility management means MGAMM and MGAMD, the authentication and mobility management means of each of the two networks manages the authentication and mobility of the user terminals of its respective network. Thus, the management means MGAMM of the mobile network RM manages the authentication and mobility of the user terminals TUM of the mobile network RM. Similarly, the management means MGAMD of the remote network RD manages the authentication and mobility of the user terminals TUD of the remote network RD. The static distributed configuration of the authentication and mobility management means MGAMM, MGAMD avoids repeat authentication of the user terminals attached to the overall network when the network topology is modified, for example if the two networks are detached during an intervention.

In the dynamic distributed configuration of the authentication and mobility management means MGAMM and MGAMD, the authentication and mobility management means of the two attached networks distribute the authentication and management of the mobility of the user terminals of the overall network. The distribution may be made on the basis of the workload of each management and authentication means. The distribution may also be made on the basis of the arrival of each user terminal on the network that corresponds with the management means. The distribution may also be made on the basis of the mobility of the user terminal. The management means that manages the mobility of a user terminal may vary over time depending on the mobility of the said terminal.

In one of the inter-network configurations applied to the authentication and mobility management means and depending on one of the inter-network configurations applied to the authentication databases, at least one intra-network control channel Cca and/or inter-network control channel Cci (type S6a with LTE technology) may be established between one of the authentication and mobility management means and one of the authentication databases of one of the two networks. In one of the inter-network configurations applied to the authentication and mobility management means and depending on one of the inter-network configurations applied to the distribution gateways (described below), at least one intra-network control channel Cca and/or inter-network control channel Cci (type S11 with LTE technology) is established between one of the authentication and mobility management means and one of the distribution gateways of one of the two networks. In one of the inter-network configurations applied to the authentication and mobility management means and depending on one of the inter-network configurations applied to the base stations (described below) at least one intra-network control channel Cca and/or inter-network control channel Cci (type S1-MME with LTE technology) is established between one of the authentication and mobility management means and one of the base stations of one of the two networks. In the dynamic distributed configuration of the authentication and mobility management means, one inter-network control channel Cci may be established between an authentication and mobility management means of a network and an authentication and mobility management means of the other network. The channel makes it possible to track the control of the mobility of a data terminal between the means for managing one network and the means for managing the other network. With LTE technology, this inter-network control channel is of the S10 type.

On authentication and mobility management level NGAMM, NGAMD, the configuration parameters configure the means of attachment to a packet network MRPM, MRPD, according to one of the following inter-network configurations: a master-slave configuration or a distributed configuration or an independent configuration.

In a master-slave configuration of the attachment means, one of the two attachment means, called the master attachment means, provides access to all the applications of the two networks. The other attachment means, called the slave attachment means, is inactive.

In a distributed configuration, the means for attachment of a network enables a terminal of the same network to access the at least one of the applications of the two networks. In that case, an intra-network or inter-network data access channel between a distribution gateway of one of the two networks and a means for attachment of a network is established for a user terminal of the same network.

In an independent configuration, the means for attachment of a network enables a user terminal of one of the two networks to access at least one specific application of one of the two networks.

In one of the inter-network configurations applied to the attachment means and depending on one of the inter-network configurations applied to the applications, an attachment means makes it possible to access at least one application via an intra-network data channel Cda and/or an inter-network data channel Cdi of the SGi type according to the LTE standard. In one of the inter-network configurations applied to the attachment means and depending on one of the inter-network configurations applied to the distribution gateways, at least one intra-network and/or inter-network access channel (type S5 or S8 with LTE technology) is established between one of the distribution gateways and one of the attachment means of one of the two networks.

On authentication and mobility management level NGAMM, NGAMD, the configuration parameters configure the distribution gateway PDM, PDD, according to one of the following inter-network configurations: a master-slave configuration, a static distributed configuration or a dynamic distributed configuration.

In the master-slave configuration of the distribution gateways, one of the two distribution gateways, called the master distribution gateway, manages the establishment of intra-network and inter-network data channels between at least one of the base stations of the two networks and at least one of the attachment means of the two networks for all the user terminals of the two networks. The other distribution gateway, called the slave distribution gateway, is inactive.

In the static distributed configuration of the distribution gateways PDM and PDD, the distribution gateway of each of the two networks manages the establishment of intra-network and inter-network data channels from the user terminals of its respective network to the attachment means with access to the applications requested by the said terminals. Thus, the distribution gateway PDM of the mobile network RM manages the establishment of intra-network and inter-network data channels from the user terminals TUM of the mobile network RM to either of the attachment means of one of the two networks. Similarly, the distribution gateway PDD of the remote network RD manages the establishment of intra-network and inter-network data channels from the user terminals TUD of the remote network RD to either of the attachment means of one of the two networks. That static distributed configuration of the distribution gateways PDN, PDD makes it possible to optimally manage the possible modifications of the network topology, for example if the two networks are detached during an intervention.

In a dynamic distributed configuration of the distribution gateways PDM and PDD, the distribution gateways of the two attached networks distribute the establishment of the intra-network data channel Cda and the inter-network data channel Cdi between the user terminals of the two networks and the attachment means of the two networks.

In one of the inter-network configurations applied to the distribution gateways and depending on one of the inter-network configurations applied to the authentication and mobility management means, at least one intra-network control channel Cca and/or inter-network control channel Cci (type S11 with LTE technology) is established between one of the distribution gateways and one of the authentication and mobility management means. In one of the inter-network configurations applied to the distribution gateways and depending on one of the inter-network configurations applied to the base stations, at least one intra-network data channel Cda and/or inter-network data channel Cdi (type S1-U with LTE technology) is established between one of the distribution gateways and one of the base stations of one of the two networks. In one of the inter-network configurations applied to the distribution gateways and depending on one of the inter-network configurations applied to the attachment means, at least one intra-network and/or inter-network access channel (type S5 or S8 with LTE technology) is established between one of the distribution gateways and one of the attachment means of one of the two networks.

On radio management level NGRM, NGRD, the configuration parameters of the said level configure the database according to one of the following inter-network configurations: a distributed configuration or an independent configuration.

In a distributed configuration of base stations, each base station can establish radio channels with the user terminals of one of the two networks. Each base station and its respective radio database is connected to the other base station and its respective radio database by an inter-network control channel Cci and an inter-network data channel Cdi. These channels make it possible to directly manage, via the base stations, the mobility of the user terminals between the two networks. With LTE technologie, the inter-network control channel Cci and the inter-network data channel Cdi between two base stations is a channel of the X2 type.

In an independent configuration of the base stations, each base station establishes a radio channel with only the user terminals of the associated network. Thus, the base station BSM of the mobile network establishes radio channels only with the user terminals TUM of the mobile network RM. Similarly, the base station BSD of the remote network establishes radio channels only with the user terminals TUD of the remote network RD. A radio channel established between a user terminal and a base station is included in the overall data channel connecting the user terminal to an application.

Intra-network control channels Cca and/or inter-network control channels Cci are established between each base station and one and/or the other authentication and mobility management means depending on one of the inter-network configurations applied to the authentication and mobility management means. Intra-network data channels Cda and/or inter-network data channels Cdi are established between each base station and one and/or the other distribution gateway depending on one of the inter-network configurations applied to the distribution gateways.

Figure 3:
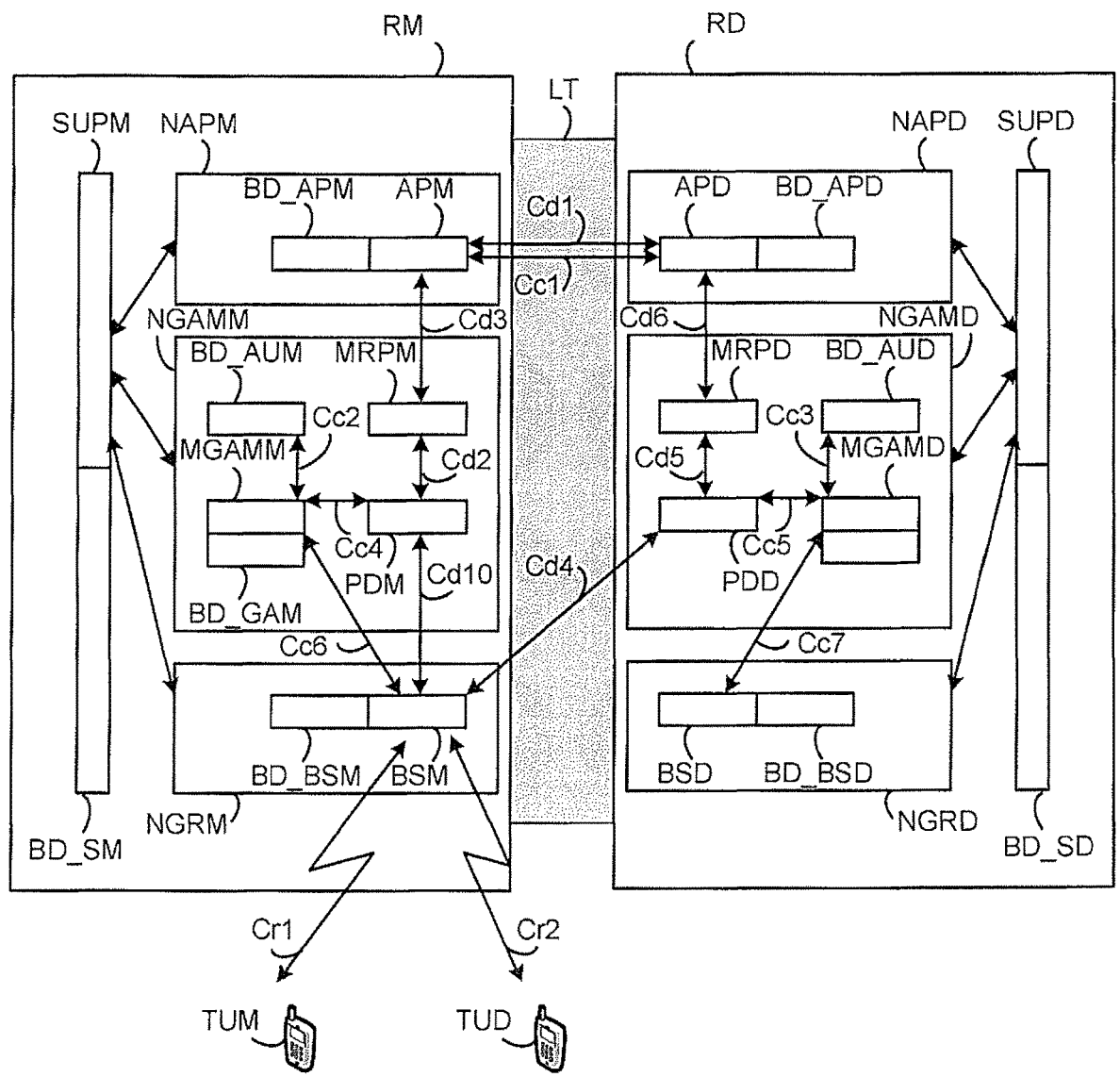
FIGS. 3 and 4 illustrate two non-limitative examples of attachments between two networks, in accordance with two inter-network operating configurations respectively according to the invention.
Figure 4:
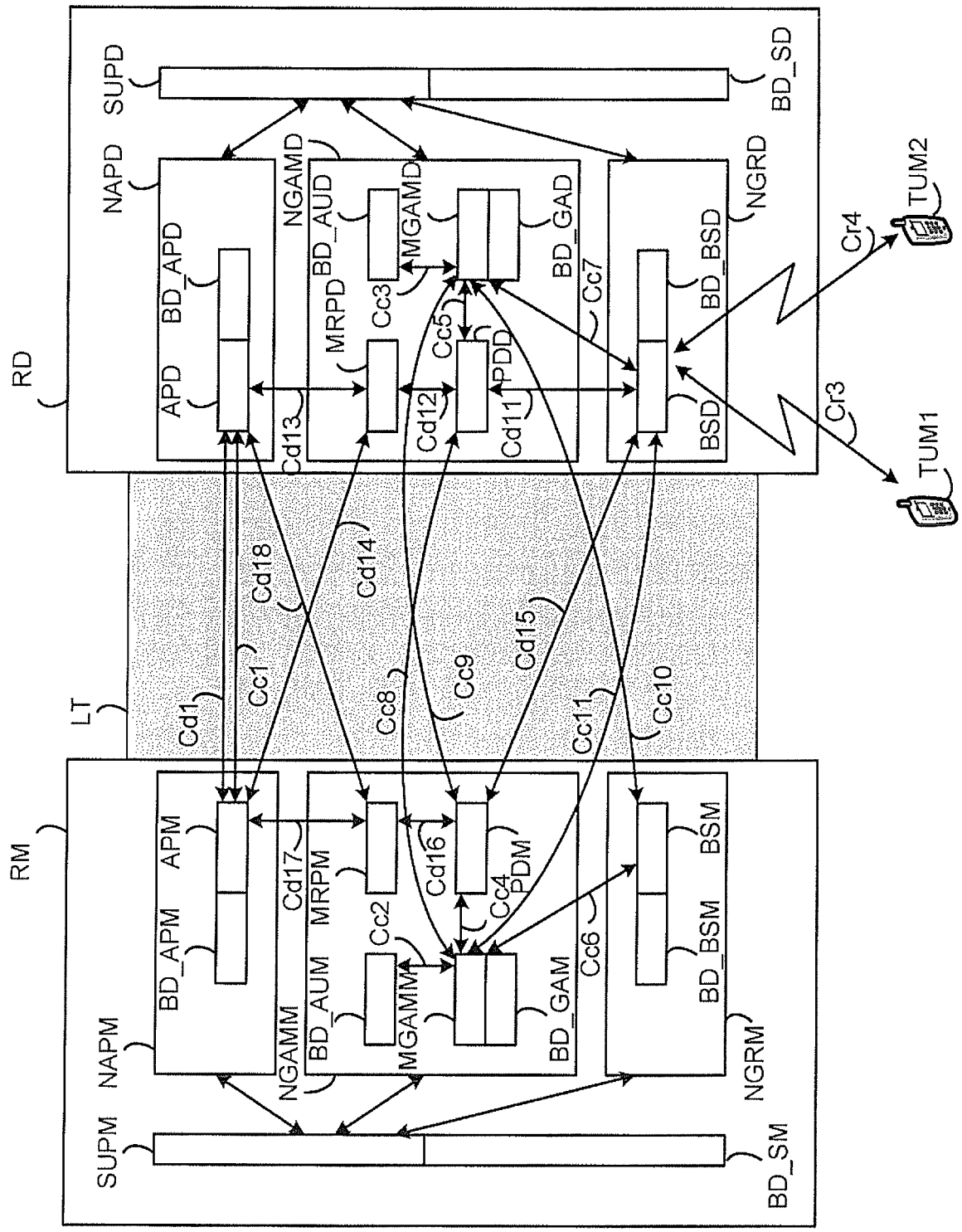

FIGS. 3 and 4 illustrate two examples of inter-network operation during the attachment between a mobile network RM and a remote network RD. The mobile network and the remote network are deployed respectively from two intervention vehicles such as military trucks.

By reference to FIG. 3, the trucks are in mission and are thus mobile. The attachment between the trucks may be stealthy. In this case of intervention, the operating models that configure each level of the two networks during the attachment are selected in view of a detachment between the two networks at any time.

On application level, each application APM, APD is configured according to a distributed inter-network operating model in the two networks.

On authentication and mobility management level, the authentication database BD_AUM, BD_AUD, the authentication and mobility management means MGAMM, MGAMD, and the distribution gateway PDM, PDD, are configured according to a static distributed inter-network operating model in the two networks. The attachment means MPRM, MPRD is configured according to a distributed inter-network operating model in the two networks.

On radio management level, the base station BSM, BSD, is configured according to a distributed inter-network operating model in the two networks.

Thus, each terminal can attach to one of the base stations of one of the two networks but can only access the application of its network. The authentication and mobility of the terminal are managed by the authentication and mobility management level of the network of origin of the terminal.

In this example, the applications of the two networks establish between themselves one control channel Cc1 and one inter-network data channel Cd1 in order to exchange data about the users.

The authentication and mobility management means MGAMM, MGAMD, of each network RM, RD establishes an intra-network control channel Cc2, Cc3 with the authentication database of the same network RM, RD. Also, the management means MGAMM, MGAMD, of each network RM, RD establishes an intra-network control channel Cc4, Cc5 with the distribution gateway PDM, PDD, of the same network RM, RD. The management means MGAMM, MGAMD of each network RM, RD establishes an intra-network control channel Cc6, Cc7 with the base station BSM, BSD of the same network RM, RD and an inter-network control channel (not represented) with the base station BSD, BSM of the other network RD, RM.

Upon the attachment of a user terminal, for example the terminal TUM, of the mobile network, with the base station BSM of the mobile network RM for accessing the application APM of the mobile network, an overall data channel is established between the user terminal TUM and the application APM. The overall data channel includes the following:
- a radio channel Cr1 between the terminal TUM, and the base station BSM,
- an intra-network data channel Cd10 between the base station BSM, and the distribution gateway PDM of the mobile network,
- an intra-network data channel Cd2 between the distribution gateway and the attachment means MRPM of the mobile network, and
- an intra-network data channel Cd3 between the attachment means MRPM and the application APM.

The establishment of an overall channel may be considered between a user terminal TUD of the remote network attaching to the said remote network RD and an application APD of the remote network. That case is not represented in FIG. 3.

Upon the attachment of a user terminal, for example the terminal TUD of the remote network, to the base station BSM of the mobile network for accessing the application APD of the remote network, an overall data channel is established between the terminal TUD and the application APD. The overall data channel includes the following:
- a radio channel Cr2 between the terminal TUD, and the base station BSM,
- an inter-network data channel Cd4 between the base station BDM of the mobile network and the distribution gateway PDD of the remote network RD,
- an intra-network data channel Cd5 between the distribution gateway PDD and the attachment means MRPD of the remote network RD, and
- an intra-network data channel Cd6 between the attachment means MRPD and the application APD.

The establishment of such an overall channel may be considered between a user terminal TUM of the mobile network attaching to the remote network RD and an application APM of the mobile network. That case is not represented in FIG. 3. The terminal TUM is present under the network cover of the remote network RD.

By reference to FIG. 4, the trucks are back in the camp and are thus temporarily fixed. In the case of an intervention, inter-network operating models are selected to obtain longer attachment between the two networks.

On application level, each application APM, APD is configured according to a distributed inter-network operating model in the two networks.

On authentication and mobility management level, the authentication database BD_AUM, BD_AUD is configured according to a static distributed inter-network operating model in the two networks. The authentication and mobility management means MGAMM, MGAMD and the distribution gateway PDM, PDD, are configured according to a dynamic distributed inter-network operating model in the two networks. The attachment means MPRM, MPRD is configured according to a distributed inter-network operating model in the two networks.

On radio management level, the base station BSM, BSD, is configured according to a distributed inter-network operating model in the two networks.

Thus, each terminal can attach to one of the base stations of one of the two networks and can access the application of one of the two networks. The authentication and mobility of the terminal are managed by the authentication and mobility management level of one of the two networks depending on its workload.

In this example, the applications of two networks establish between themselves one inter-network control channel Cc1 and one internetwork data channel Cd1 in order to exchange data about the users.

The authentication and mobility management means MGAMM, MGAMD, of each network RM, RD establishes an intra-network control channel Cc2, Cc3 with the authentication database of the same network RM, RD and an inter-network control channel (not shown in FIG. 4) with the authentication database of the other network RD, RM. Also, the management means MGAMM, MGAMD of each network RM, RD establishes an intra-network control channel Cc4, Cc5 with the distribution gateway PDM, PDD of the same network RM, RD and an inter-network control channel Cc8, Cc9 with the distribution gateway PDD, PDM of the other network RD, RM. The management means MGAMM, MGAMD of each network RM, RD establishes an intra-network control channel Cc6, Cc7 with the base station BSM, BSD of the same network RM, RD and an inter-network control channel Cc10, Cc11 with the base station BSD, BSM of the other network RD, RM.

A user terminal, such as the terminal TUM1 of the mobile network RM, attaches to the base station BSD of the remote network RD, to access one of the applications APM and APD of one of the two networks. The authentication and mobility of the terminal TUM1 may be managed directly by the authentication and mobility management means MGAMD of the remote network depending on its workload. In that case, the overall data channel established between the terminal TUM1 and one of the applications APD, APM includes:
- a radio channel Cr3 between the terminal TUM1 and the base station BSD,
- an intra-network data channel Cd11 between the base station BSD of the mobile network and the distribution gateway PDD of the remote network,
- an intra-network data channel Cd12 between the distribution gateway PDD and the attachment means MRPD of the remote network RD, and
- an intra-network data channel Cd13 between the attachment means MRPD and the application APD or an inter-network data channel Cd14 between the attachment means MRPD and the application APM.

The terminal TUM1 can directly access the distributed application APD which exchanges user data of the terminal with the distributed application APM via the inter-network control and data channels Cc1 and Cd1.

Similarly, a similar overall data channel can be established in the network RD between a terminal TUD of the remote network covered by the remote network and one of the applications of the two networks. The authentication and mobility of the terminal TUD are managed by the authentication and mobility management means of the remote network. That case is not represented in FIG. 4.

The establishment of such an overall channel may also be considered between a user terminal TUD of the remote network attaching to the mobile network RM and one of the applications APM or APD. The authentication and mobility of the terminal TUD are in that case managed by the authentication and mobility management means MGAMM of the mobile network. A radio channel is established between the terminal TUD, and the base station BSM. Intra-network data channels are established successively between the base station BSM of the mobile network, the distribution gateway PDM of the mobile network, the attachment means MRPM of the mobile network and one of the two applications APM, APD. That case is not represented in FIG. 4.

Similarly, a similar overall data channel can be established in the network RM between a terminal TUM of the mobile network covered by the mobile network and one of the applications of the two networks. The authentication and mobility of the terminal TUM are managed by the authentication and mobility management means of the mobile network. That case is not represented in FIG. 4.

In another case, a user terminal, such as the terminal TUM2 of the mobile network RM, attaches to the base station BSD of the remote network RD, to access one of the applications APM and APD of one of the two networks. The authentication and mobility of the terminal TUM2 can be managed by the authentication and mobility management means MGAMM of the mobile network. In that case, the overall data channel established between the terminal TUM2 and one of the applications APD, APM includes:
  a radio channel Cr4 between the terminal TUM2 and the base station BSD,
  an inter-network data channel Cd15 between the base station BSD and the distribution gateway PDM of the mobile network,
  an intra-network data channel Cd16 between the distribution gateway PDM and the attachment means MRPM of the mobile network RM, and
  an intra-network data channel Cd17 between the attachment means MRPD and the application APD or an inter-network data channel Cd18 between the attachment means MRPD and the application APM.

Similarly, a similar overall data channel can be established between a terminal TUD of the remote network covered by the remote network and one of the applications of the two networks. The authentication and mobility of the terminal TUD are managed by the authentication and mobility management means of the mobile network. That case is not represented in FIG. 4.

The establishment of such an overall channel may be considered between a user terminal TUD of the remote network attaching to the said mobile network RM and one of the applications APM or APD. The authentication and mobility of the terminal TUD are in that case managed by the authentication and mobility management means MGAMD of the remote network. A radio channel is established between the terminal TUD, and the base station BSM. An inter-network data channel is established between the base station BSM of the mobile network and the distribution gateway PDD of the remote network. And intra-network data channels are established successively between the distribution gateway PDD of the remote network, the attachment means MRPD of the remote network and one of the two applications APD, APM. That case is not represented in FIG. 4.

Similarly, a similar overall data channel can be established between a terminal TUM of the mobile network covered by the mobile network and one of the applications of the two networks. The authentication and mobility of the terminal TUM are managed by the authentication and mobility management means of the remote network. That case is not represented in FIG. 4.

Figure 5:
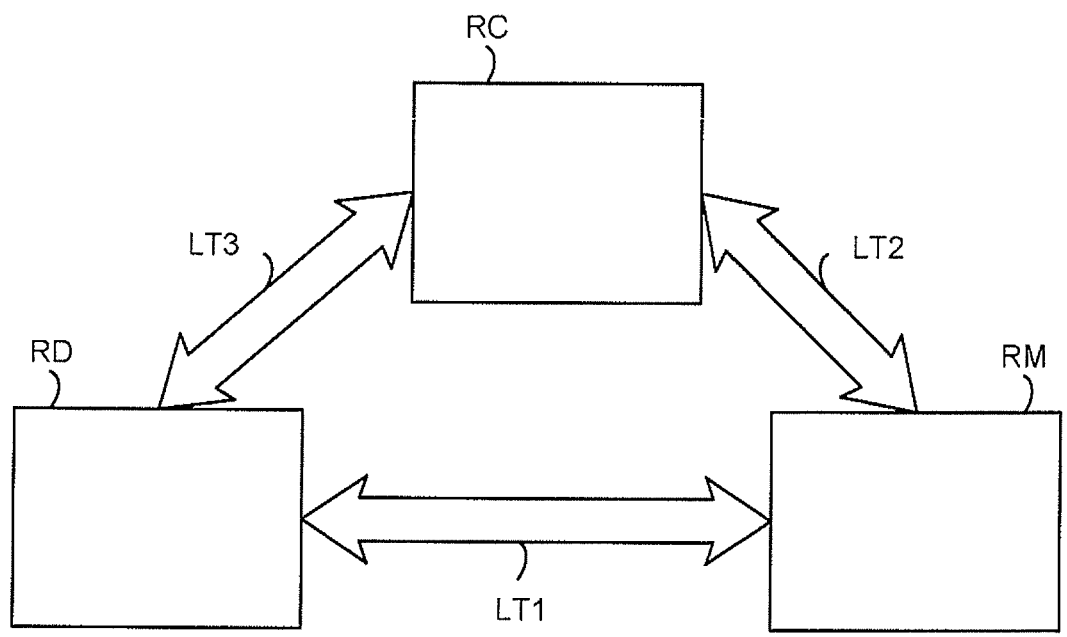
FIGS. 5 and 6 illustrate two non-limitative examples of attachment between three networks.
Figure 6:
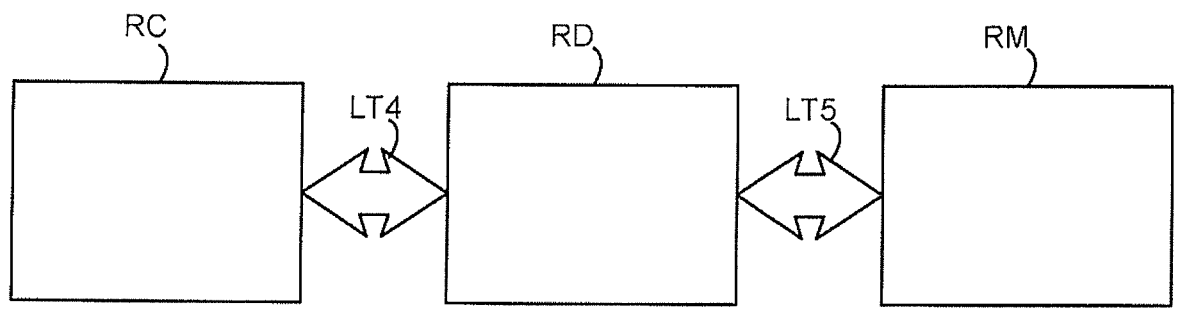

It must be noted that throughout the description, the attachment is made in a non-limitative manner between two networks (remote network and mobile network). However, such attachment may be achieved between more than two networks, for example six networks. FIGS. 5 and 6 illustrate an example of the implementation of the attachment method between three radiocommunications networks: two mobile networks RM and RD and a centralised network RC. The networks RM and RD are tactical networks. The network RC is a fixed radiocommunications network. The network RC comprises infrastructure similar to the infrastructures of the networks RM and RD presented above. The infrastructure of the RC network comprises:
  a centralised supervision means,
  a centralised application level, comprising at least one centralised application, and
  a centralised authentication and mobility management level NGAMC comprising:
    a centralised authentication database,
    a centralised authentication and mobility management means,
    a centralised means for attachment to a packet network allowing IP access to at least the centralised application, and
    a centralised distribution gateway.
  a centralised radio management level, and
  user terminals.

The centralised network RC particularly allows access by the user terminals to a series of centralised applications (or services) for communication at a level above that of the applications embedded in the tactical networks. A centralised application can for example allow the routing of communication established between the different user terminals of the overall network.

During attachments between the three networks, the topology of all the attached networks may take the form of a star or a chain. In a star topology, by reference to FIG. 5, each network is attached to each of the other networks by a transport link. The network RM is attached to the network RD by means of a first transport link LT1 and is attached to the network RC by means of a second transport link LT2. The network RD is attached to the network RM by means of the first transport link LT1 and is attached to the network RC by means of a third transport link LT3. The network RC is attached to the network RM by means of the second transport link LT2 and is attached to the network RD by means of the third transport link LT3.

In a chain topology, the networks are attached successively to each other. For example, by reference to FIG. 6, the network RC is attached to the network RD via a first transport link LT4, and the network RD is also attached to the network RM via a second transport link LT5. A centralised application of the network RC is thus accessible by the network RM via the establishment of intra-network and inter-network data and control channels between the network RM and the network RD and between the network RD and the network RC.

The step of synchronisation between two networks makes it possible to select the inter-network operating models per compatible levels, taking account of the working of the three networks. In a chain topology, a first network attaches to a second remote network already attached to a third network. Attachment between the first and the second network takes account of the configuration of the second network depending on the third one. In a star topology, attachment between a first network and two other networks takes account of the inter-network operation of the other two networks.

It will be obvious to a person of the art, according technology advances, that the inventive concept can be implemented differently. The invention and its achievements are not limited to the examples described above but may be varied, remaining within the scope of the claims.

The invention claimed is:

1. A method for attachment between a mobile broadband cellular radio communications network and at least one remote broadband cellular radio communications network, the method comprising the following steps:

upon detection of the at least one remote broadband cellular radio communications network by the mobile broadband cellular radio communications network or detection of the mobile broadband cellular radio communications network by the at least one remote broadband cellular radio communication network:

configuring a first application level, a first authentication and mobility management level, and a first radio management level of the mobile broadband cellular radio communications network in accordance with at least three first inter-network operating models corresponding respectively to the first application level, to the first authentication and mobility management level, and to the first radio management level, the at least three first inter-network operating models being part of a record previously saved in a mobile broadband cellular radio communications network supervision database to attach to the at least one remote broadband cellular radio communications network;

configuring a second application level, a second authentication and mobility management level, and a second radio management level of the at least one remote broadband cellular radio communications network in accordance with at least three second inter-network operating models corresponding respectively to the second application level, to the second authentication and mobility management level, and to the second radio management level, the at least three second inter-network operating models being part of a record previously saved in a remote broadband cellular radio communications network supervision database to attach to the mobile broadband cellular radio communications network;

establishing at least one inter-network control channel between one element of the mobile broadband cellular radio communications network and one element of the at least one remote broadband cellular radio communications network and at least one inter-network data channel between one element of the mobile broadband cellular radio communications network and one element of the at least one remote broadband cellular radio communications network in accordance with the at least three first and the at least three second inter-network operating models configured per level; and attaching a transport link including an inter-network supervision channel established between a network supervision means of the mobile broadband cellular radio communications network and a network supervision means of the at least one remote broadband cellular radio communication network to obtain a single network encompassing first user terminals of the mobile broadband cellular radio communications network and second user terminals of the at least one remote broadband cellular radio communications network, wherein each of the first and second user terminals of the single network is authenticated by the single network, wherein the configuring the first application level, the first authentication and mobility management level, and the first radio management level is performed by the mobile broadband cellular radio communications network, the configuring the second application level, the second authentication and mobility management level, and the second radio management level is performed by the at least one remote broadband cellular radio communications network, and the establishing the at least one inter-network control channel and the at least one inter-network data channel and the attaching the transport link are performed by the mobile broadband cellular radio communications network or by the at least one remote broadband cellular radio communications network, and wherein the method further comprises, before the configuration of the first and second application levels, analysing the at least three first inter-network operating models, performed by the network supervision means of the mobile broadband cellular radio communications network, to check if at least one first inter-network operating model for the first application level is compatible with at least one second inter-network operating model for the second application level, at least one first inter-network operating model for the first authentication and mobility management level is compatible with at least one second inter-network operating model for the second authentication and mobility management level, and at least one first inter-network operating model for the first radio management level is compatible with at least one second inter-network operating model for the second radio management level, and analysing the at least three second inter-network operating models, performed by the network supervision means of the at least one remote broadband cellular radio communications network, to check if at least one second inter-network operating model for the second application level is compatible with at least one first inter-network operating model for the first application level, at least one second inter-network operating model for the second authentication and mobility management level is compatible with at least one first inter-network operating model for the first authentication and mobility management level, and at least one second inter-network operating model for the second radio management level is compatible with at least one first inter-network operating model for the first radio management level.

2. The method according to claim 1, characterised in that it comprises, before the configuration steps, a synchronisation step, between the first application level and the second application level, between the first authentication and mobility management level and the second authentication and mobility management level, and between the first radio management level and the second radio management level, to synchronize the first inter-network operating models with the second inter-network operating models.

3. The method according to claim 2, characterised in that it comprises, before the synchronisation step, establishing the inter-network supervision channel between the supervision means of the mobile broadband cellular radio communications network and the supervision means of the at least one remote broadband cellular radio communications network.

4. The method according to claim 1, characterised in that one first inter-network operating model comprises parameters for configuration of the first application level, one first inter-network operating model comprises parameters for configuration of the first authentication and mobility management level, and one first inter-network operating model comprises parameters for configuration of the first radio management level, and one second inter-network operating model comprises parameters for configuration of the second application level, one second inter-network operating model comprises parameters for configuration of the second authentication and mobility management level, and one second inter-network operating model comprises parameters for configuration of the second radio management level.

5. The method according to claim 1, characterised in that configuration parameters of the first application level configure at least one application of the first application level according to an inter-network configuration and configuration parameters of the second application level configure at least one application of the second application level according to the inter-network configuration, the inter-network configuration selected from the group consisting of a master-slave configuration, a distributed configuration and an independent configuration.

6. The method according to claim 1, characterised in that parameters for configuration of the first authentication and mobility management level configure an authentication database of the first authentication and mobility management level in accordance with an inter-network configuration, and parameters for configuration of the second authentication and mobility management level configure an authentication database of the second authentication and mobility management level in accordance with the inter-network configuration, the inter-network configuration selected from the group consisting of a master-slave configuration and a distributed configuration.

7. The method according to claim 1, characterised in that parameters for configuration of the first authentication and mobility management level configure an authentication and mobility management means of the first authentication and mobility management level in accordance with an inter-network configuration, and parameters for configuration of the second authentication and mobility management level configure an authentication and mobility management means of the second authentication and mobility management level in accordance with the inter-network configuration, the inter-network configuration selected from the group consisting of a master-slave configuration, a static distributed configuration and a dynamic distributed configuration.

8. The method according to claim 1, characterised in that parameters for configuration of the first authentication and mobility management level configure a distribution gateway of the first authentication and mobility management level in accordance with an inter-network configuration, parameters for configuration of the second authentication and mobility management level configure a distribution gateway of the second authentication and mobility management level in accordance with the inter-network configuration, the inter-network configuration selected from the group consisting of a master-slave configuration, a static distributed configuration and a dynamic distributed configuration.

9. The method according to claim 1, characterised in that parameters for configuration of the first authentication and mobility management level configure a means for attachment to a packet network of the first authentication and mobility management level in accordance with an inter-network configuration, and parameters for configuration of the second authentication and mobility management level configure a means for attachment to a packet network of the second authentication and mobility management level in accordance with the inter-network configuration, the inter-network configuration selected from the group consisting of a master-slave configuration, a distributed configuration and an independent configuration.

10. The method according to claim 1, characterised in that parameters for configuration of the first radio management level configure a first radio database in accordance with an inter-network configuration, and parameters for configuration of the second radio management level configure a second radio database in accordance with the inter-network configuration, the inter-network configuration selected from the group consisting of a distributed configuration and an independent configuration.

11. A radio communications system for implementing the method of claim 1, the radio communications system comprising:
    the mobile broadband cellular radio communications network that comprises:
        the network supervision means of the mobile broadband cellular radio communications network comprising a first processor configured to:
            (a) configure the first application level, the first authentication and mobility management level, and the first radio management level of the mobile broadband cellular radio communications network in accordance with the at least three first inter-network operating models corresponding respectively to the first application level, to the first authentication and mobility management level, and to the first radio management level,
            (b) establish the least one inter-network control channel and the least one inter-network data channel in accordance with the at least three first and the at least three second inter-network operating models configured per level,
            (c) attach the transport link including the inter-network supervision channel established between the network supervision means of the mobile broadband cellular radio communications network and the network supervision means of the at least one remote broadband cellular radio communication network to obtain the single network, and
            (d) before the configuration of the first and second application levels, analyze the at least three first inter-network operating models to check if at least one first inter-network operating model for the first application level is compatible with at least one second inter-network operating model for the second application level, at least one first inter-network operating model for the first authentication and mobility management level is compatible with at least one second inter-network operating model for the second authentication and mobility management level, and at least one first inter-network operating model for the first radio management level is compatible with at least one second inter-network operating model for the second radio management level;
        the first application level comprising a first server configured to run at least one first application;
        the first authentication and mobility management level for authenticating the first and second user terminals;
        the first radio management level comprising at least one first base station; and
        the first user terminals; and
    the at least one remote broadband cellular radio communications network that comprises:

the network supervision means of the at least one remote broadband cellular radio communication network comprising a second processor configured to:
- (a) configure the second application level, the second authentication and mobility management level, and the second radio management level of the at least one remote broadband cellular radio communications network in accordance with at least three second inter-network operating models corresponding respectively to the second application level, to the second authentication and mobility management level, and to the second radio management level,
- (b) establish the at least one inter-network control channel between one element of the mobile broadband cellular radio communications network and one element of the at least one remote broadband cellular radio communications network and at least one inter-network data channel between one element of the mobile broadband cellular radio communications network and one element of the at least one remote broadband cellular radio communications network in accordance with the at least three first and the at least three second inter-network operating models configured per level,
- (c) attach the transport link including the inter-network supervision channel established between the network supervision means of the mobile broadband cellular radio communications network and the network supervision means of the at least one remote broadband cellular radio communication network to obtain the single network, and
- (d) before the configuration of the first and second application levels, analyze the at least three second inter-network operating models to check if at least one second inter-network operating model for the second application level is compatible with at least one first inter-network operating model for the first application level, at least one second inter-network operating model for the second authentication and mobility management level is compatible with at least one first inter-network operating model for the first authentication and mobility management level, and at least one second inter-network operating model for the second radio management level is compatible with at least one first inter-network operating model for the first radio management level;

the second application level comprising a second server configured to run at least one second application;

the second authentication and mobility management level for authenticating the first and second user terminals;

the second radio management level comprising at least one second base station; and the second user terminals.

* * * * *